(12) United States Patent
Hausner et al.

(10) Patent No.: US 8,550,419 B2
(45) Date of Patent: Oct. 8, 2013

(54) ERECTION SYSTEM FOR A PHOTOVOLTAIC OPEN-SPACE INSTALLATION SUPPORT STAND

(75) Inventors: Martin Hausner, Tucson, AZ (US); Ludwig Schletter, Haag (DE)

(73) Assignee: Schletter GmbH, Kirchdorf (DE)

( * ) Notice: Subject to any disclaimer, the term of this patent is extended or adjusted under 35 U.S.C. 154(b) by 913 days.

(21) Appl. No.: 12/139,144

(22) Filed: Jun. 13, 2008

(65) Prior Publication Data

US 2009/0256046 A1 Oct. 15, 2009

(30) Foreign Application Priority Data

Apr. 10, 2008 (DE) .................. 10 2008 018 422

(51) Int. Cl.
*A47G 29/00* (2006.01)

(52) U.S. Cl.
USPC ........... 248/370; 248/398; 248/455; 126/704; 126/696; 52/173.3

(58) Field of Classification Search
USPC ......... 248/370, 398, 455, 461, 449, 415, 458; 160/67, 47; 126/704, 696; 52/173.3; 211/195
See application file for complete search history.

(56) References Cited

U.S. PATENT DOCUMENTS

| | | | | |
|---|---|---|---|---|
| 1,617,964 A | * | 2/1927 | Richards | 160/47 |
| 3,221,756 A | * | 12/1965 | Rupright | 135/98 |
| 3,263,388 A | * | 8/1966 | Bogert | 52/665 |
| 3,789,903 A | * | 2/1974 | Clark et al. | 135/88.12 |
| 4,724,882 A | * | 2/1988 | Wang | 160/69 |
| 4,841,708 A | * | 6/1989 | Johnston | 52/646 |
| 4,995,377 A | * | 2/1991 | Eiden | 126/605 |
| 5,125,608 A | * | 6/1992 | McMaster et al. | 248/163.1 |
| 5,228,924 A | * | 7/1993 | Barker et al. | 136/246 |
| 5,969,501 A | * | 10/1999 | Glidden et al. | 320/101 |
| 6,021,835 A | * | 2/2000 | Malott | 160/67 |
| 6,152,157 A | * | 11/2000 | Jang | 135/131 |
| 6,276,424 B1 | * | 8/2001 | Frey, Jr. | 160/67 |
| 6,488,069 B1 | * | 12/2002 | Mashaw et al. | 160/67 |
| 6,918,399 B2 | * | 7/2005 | Ko | 135/29 |
| RE40,657 E | * | 3/2009 | Suh | 403/109.3 |
| 7,896,015 B2 | * | 3/2011 | Milano et al. | 135/90 |
| D640,972 S | * | 7/2011 | Fiero | D13/102 |
| 2007/0186967 A1 | * | 8/2007 | Zingerle | 135/145 |
| 2007/0209691 A1 | * | 9/2007 | Lin | 135/32 |
| 2008/0078433 A1 | * | 4/2008 | Jang | 135/147 |
| 2008/0210221 A1 | * | 9/2008 | Genschorek | 126/704 |
| 2010/0122777 A1 | * | 5/2010 | Gutierrez | 160/59 |

FOREIGN PATENT DOCUMENTS

| | | |
|---|---|---|
| DE | 3840895 A1 | 10/1989 |
| DE | 10 2005 007 184 B3 | 7/2006 |
| DE | 20 2007 010 725 U1 | 1/2008 |
| WO | WO 2006086937 A1 * | 8/2006 |
| WO | 2007/038760 A2 | 4/2007 |

OTHER PUBLICATIONS

Montageanleitung fur das Freilandsystem FX Generation IV, Schletter Solar-Montagesysteme. Haag, Germany, [online] [retrieved on Sep. 13, 2011] Retrieved from the Internet <URL: http://Solar-zipser.de/upload/file/FS%20V%20Generation%20Montageanleitung%20deutseh%5B1%5D.pdf.>.

* cited by examiner

*Primary Examiner* — Terrell McKinnon
*Assistant Examiner* — Daniel J Breslin
(74) *Attorney, Agent, or Firm* — Norman B. Thot

(57) ABSTRACT

The present invention is directed to an erection system for a photovoltaic open-space installation support stand and a method for assembling this type of erection system. The present erection systems provide a permanently settable inclination favorable for generating solar power for the photovoltaic equipment on open ground with linear bearings.

23 Claims, 10 Drawing Sheets

ERECTION SYSTEM FOR A PHOTOVOLTAIC OPEN-SPACE INSTALLATION SUPPORT STAND

CROSS-REFERENCE TO RELATED PATENT APPLICATIONS

This patent application is based on and claims the benefit of German Application No. DE 10 2008 018 422 filed on Apr. 10, 2008, the content of which is incorporated herein in its entirety by reference thereto.

FIELD OF THE INVENTION

The invention relates to an erection system for a photovoltaic open-space installation support stand, a method for assembling this type of erection system, as well as a support stand constructed from the erection system and the stand's stationary configuration. Support stands constructed from these erection systems provide a permanently settable inclination favorable for generating solar power for the top components of the photovoltaic equipment on open ground with linear bearings.

BACKGROUND OF THE INVENTION

Erection systems for such support stands are already known to the person skilled in the art. They essentially comprise a column to be driven in the ground, an inclined beam as the linear bearing, an additional brace to brace the inclined beam against the column, as well as three link joints. Due to the link joints, the column, the inclined beam, and the brace can be combined to form a permanently settable support stand in the form of a triangular truss. The two link joints here encompass one separate link attachment extension each relative to the inclined beam. These two link joints are rigidly mountable on the ends of the brace and the column, and can be clamped in place by means of screw bolts on the inclined beam along a longitudinal guide in different positions and at various angular positions. Longitudinal guide, pivot bearing, and clamping are affected depending on system using the same screw bolts. Installation of the components of such a system, including adjustment procedures for the correct inclination and position of the inclined beam, involves a number of manipulations and some time, while at the same time requiring conscientious work.

The problem to be solved by the invention is therefore to provide the installer with an erection system of the above-referenced type that can be erected more easily and quickly than previously.

SUMMARY OF THE INVENTION

The present invention solves these problems and provides an erection system for support stands for photovoltaic open-space installations. Accordingly, for each support stand one column and one inclined beam is provided, as well as a brace to brace the inclined beam against the column, wherein the column, inclined beam, and brace can be combined to form a permanently settable support stand in the form of a triangular truss, and to this end a first link joint is provided between inclined beam and column, a second link joint is provided between inclined beam and brace, a third link joint is provided between brace and column, and the first link joint comprises a first link attachment extension, and the second link joint comprises a second link attachment extension, and the two link attachment extensions are configurable as longitudinally guided on the inclined beam.

The innovation consists in the fact that an assembly group comprising the inclined beam and the two link attachment extensions is combined, wherein the two link attachment extensions are longitudinally guided in a nonrotatable manner and permanently set there at standard positions, and that the column is pivotingly connectable to the first link attachment extension while the brace is pivotingly connectable to the second link attachment extension.

The column here of the erection system according to the invention is designed to be clamped in place in stationary fashion at the site of the open-space installation, in particular, in the ground or on a foundation, and to transmit loads downward. A vertical foundation by means of pile-driving has proven to be most successful here in practice. It is also conceivable for the column to be erected in tilted fashion.

The inclined beam is provided as a linear bearing for the top components of the open-space installation. With the support stand erected, the inclined beam is ideally oriented south relative thereto and runs in a permanently set inclination that is favorable for generating solar power. In particular, transverse modular support profiles can be mounted on the inclined beams, on which profiles the photovoltaic modules of the open-space installation are in turn installable.

With the support stand erected, the inclined beam is disposed in a statically favorable position between its ends, preferably directly over the column, and the brace can brace the inclined beam obliquely downward against the column. This enables a rigid truss to be generated that in its design includes the basic shape of a triangle. This triangular geometry is advantageously based, as is familiar in the art, on the result of structural analysis that is preferably performed by a structural engineer and in particular takes into account the desired inclination, length, and mechanical load of the inclined beam. The positions of the first and second link joints along the inclined beam and the position of the third link joint along the column can be determined based on this type of structural analysis and accordingly be the standard positions.

In contrast to the known installation system, the principal functions of the two link attachment extensions, and specifically in providing, on the one hand, a pivot bearing and on the other hand an attachment extension piece, are disposed in reversed fashion. According to the invention, the link attachment extensions can thus be attached on the inclined beam, and instead, the column and the brace are disposed pivotingly relative to the link attachment extensions. In addition, the link attachment extensions are longitudinally guided nonrotatably on the inclined beam, with the result that sliding the link attachment extensions longitudinally along the inclined beam continues to be possible, while on the other hand any twisting relative to the inclined beam is prevented. In particular, what is finally important here is that the link attachment extensions are prefabricated on the inclined beam and thus form an assembly group together with the inclined beam. A critical aspect here is that the link attachment extensions are already permanently attached at their predetermined standard positions along the inclined beam, i.e., at the positions at which the link attachment extensions are provided based on the above-referenced structural analysis for a support stand erected according to plan.

The principal advantage of the invention results from the prefabricated assembly group. While pre-assembly would theoretically be possible with an erection system known from the art, it is not however possible in practice due to the triple function of the screw bolts mentioned in the introduction since the link attachment extensions must not only be clamped in place at their standard position but at the same time at their precise angular positions. The fact that the functions pivot bearing and attachment are provided as spatially switched according to the invention enables the link attachment extensions to be longitudinally guided in nonrotatable fashion on the inclined beam. As a result, it is now easily possible to attach permanently the link attachment extensions at the specified site on the inclined beam regardless of the pivot bearing, preferably at the factory and in massed-produced fashion.

The prefabricated assembly group saves the installer on site some essential manipulations when erecting the support stand. For example, not only the work of assembling the link attachment extensions, but in particular the inclination adjustment for the inclined beam and positioning thereof over the column is completely eliminated, this operation being an essential part of the erection operation in the prior art due to the triple function of the screw bolts. For the same reason, it is now easier than previously for the installer, particularly when given a deficiently set column, to readjust the inclination and position of the inclined beam. The two link attachment extensions on the inclined beam can each be individually loosened from their standard position, moved, and permanently reattached at a suitable corrected position without forcing the rigid angle of the triangular truss since the three link joints can remain free of rotation during and even after installation.

In sum, what must be noted is that the erection system according to the invention can even be erected by a less-experienced installer in significantly less time than previously for a support stand. The erection system is thus suitable in particular for photovoltaic open-space installations on an industrial scale.

In a first preferred embodiment, at least one of the two link attachment extensions has a link section to support a hinge pin, wherein the link section is disposed such that the rotational axis of a hinge pin supported there crosses the inclined beam externally. Preferably, the hinge pin can be supported such that when the support stand is erected its rotational axis crosses the inclined beam underneath. This can significantly simplify the design of the link attachment extensions. Given sufficient distance between the inclined beam and the rotational axis, the access for detaching, moving, and attaching the link attachment extensions along the inclined beam can also be kept free of swivelable components. As a result, the link attachment extension along the inclined beam can also be designed in a correspondingly short fashion without, for example, being covered in crossing fashion by the brace. For purposes of supporting the hinge pin, in particular, axial holes can be provided in the link section, thereby allowing a pivot bearing to be fabricated simply and reliably. The fact that the rotational axis runs externally enables a single and correspondingly longer hinge pin to be used here without penetrating the inclined beam. Finally, the second hinge pin is preferably designed such that a brace installed there is retractable towards the inclined beam.

In a further embodiment, the link section of at least one link attachment extension is designed to have a U-profile shape. This link section runs, in particular, parallel to the inclined beam and is opened downward when the support stand is erected. The section can function analogously to an axle guard with two opposing flanges that can pivotingly accommodate the end of the column or the brace or any fork heads mounted thereon by means of a hinge pin. In addition, the U-profile-shaped link attachment extensions can be essentially be mass-produced simply and inexpensively by trimming to size an extruded section.

In another preferred embodiment, the link section of at least one link attachment extension has open axial slots to support a hinge pin. One hinge pin can be inserted more easily into the preferably two open axial slots than into axial holes since during erection the link parts for attachment no longer have to be made to exactly coincide axially. In addition, it is particularly advantageously possible to preinstall the hinge pin to the counterpart of the link joint.

In addition, it can be advantageous to design the open axial slots of the link section of the first link attachment extension such that the slots are open facing downward when the support stand is erected. This enables the first link joint to be produced at least preliminarily by simply applying the inclined beam. To this end, the inclined beam simply needs to be placed by its first link attachment extension onto a hinge pin that has already been installed on the column or on any fork head already mounted thereon. When the support stand is erected, the open axial slots here are preferably oriented approximately vertically downward. A deviation of several degrees is very tolerable, however, so that this type of link attachment extension is suitable for inclined beams at different inclinations. In particular, it is advantageous to provide the axial slots approximately at an angle of 60.degree. relative to the inclined beam.

In a further embodiment, the link section of at least one link attachment extension comprises a locking means against radial loosening of a hinge pin from the open axial slots. This can, in particular, reliably prevent detachment of the inclined beam in response to the lifting effect of wind loads.

What is preferably provided as a locking means against radial loosening is a locking slide that is insertable tangentially to the hinge pin into the link section. This type of locking slide can in particular be designed as a plate that is insertable into the inner longitudinal guides of a U-profile-shaped link section below the hinge pin, i.e., on the side of the hinge pin opposite the inclined beam.

In another preferred embodiment, the inclined beam has relative to the longitudinal guide of the two link attachment extensions at least one longitudinal groove that is undercut. With reference to an erected support stand, one undercut longitudinal groove each is integrated in the left and right external side of the inclined beam. The longitudinal groove enables the link attachment extensions to be easily and reliably slid along the inclined beam and attached. A simple proven combination of slot element and bolt can be used in particular for this purpose. In order to longitudinally guide the link attachment extensions on the inclined beam nonrotatably, what can be provided alternatively or additionally is a guide strip on the link attachment extension running parallel to the longitudinal groove. Preferably, however, it is possible to provide at least two combinations of slot element and bolt spaced apart in the same longitudinal groove for each link attachment extension so as to thereby prevent any rotation.

In another preferred embodiment, at least one of the two link attachment extensions has a U-profile-shaped attachment extension on which the link attachment extension is attached to the inclined beam in a nonrotatably longitudinally guided manner. Analogously to the link section, the attachment extension can also be designed as U-shaped. Here the inner contour of the attachment extension preferably corresponds to the outer contour of the inclined beam such that the attachment extension encompasses the inclined beam in the manner of a movable slide. This type of attachment extension can in particular be permanently clamped to the above-referenced longitudinal groove.

In another preferred embodiment, at least one of the two link attachment extensions is designed in an H-profile shape, wherein the shape of the link attachment extension results from the above-described U-profile-shaped link section and the U-profile-shaped attachment extension. This enables the inner contour of the link attachment extension at its upper section to correspond to the inclined beam, and at its lower section to correspond to the brace or the column or any link partners mounted thereon. In addition, this type of link attachment extension can be fabricated simply and inexpensively by trimming to size a correspondingly extruded section.

In an especially preferred embodiment, the first link joint comprises a fork head that is mounted on the top end of the column and can be pivotingly connected to the first link attachment extension by a hinge pin. The top end of the column has only limited suitability as a link partner since it can be slightly damaged during erection, in particular during erection by pile-driving. This is where a separate fork head, which is preferably mounted only after erection of the column, offers particular advantages. The column is accordingly pivotingly connectable to the first link attachment extension by means of this interposed fork head.

In a further embodiment, the fork head can be slidably mounted perpendicular to the column and/or parallel to the column. This enables deviations from the vertical and deviations from the specified height to be corrected which often result in practice during erection of the column. Transverse and height adjustability of approximately +−15 mm is sufficient in most cases.

In a further optimization, the fork head can height-adjustably accommodate a hinge pin. To this end, the fork head can have two flanges in which axial slots are contained that run vertically in the erected support stand. The hinge pin can be clamped in place to the flanges at different heights. Mutually engaging serrations can be integrated here to the screw nuts provided for the hinge pins as well as to the flanges to secure against slippage. Supplementally, it is possible to provide the axial slots so as to be open upwards.

In another preferred embodiment, one additional rotatory degree of freedom each is provided in the first and third link joint to compensate for twisting of an erected column. This enables the inclined beam together with the brace to be moved into the intended azimuthal orientation despite the column's having possibly been erected in twisted fashion in its longitudinal axis. Compensation of twisting is particularly important whenever the column is to be arranged in an array of columns. A rotational range of approximately +−10° has proven to be sufficient. The additional rotational axes preferably align vertically or parallel with the column. However, it is also possible to provide the additional rotational axes to a limited degree in bent fashion. What is essential is that the inclined beam together with the brace be rotatable approximately about the longitudinal axis of the column.

In a further embodiment in combination with the above-described fork head, this fork head can be mounted around the column and/or vertically rotatable on the top end of the column.

And in a further embodiment in connection with the third link joint, this joint encompasses a link part with two mutually perpendicular rotational axes, where the link part can be disposed on the column and on the bottom end of the brace. This type of link part can preferably be designed in the manner of a universal joint, although it is not necessary for joint's rotational axes to intersect. For purposes of simple connection to the column, axial holes can be provided there at the specified height for a hinge pin that can interact with the link part.

In another embodiment, multiple axial holes for a hinge pin are provided along the column at various heights for the third link joint. This can be advantageous both for a simple pivot joint as well as for the above-described link part since in this way a standard column can be flexibly suited for different inclinations of the inclined beam and for different brace lengths.

In an especially preferred embodiment, the assembly group according to the invention also comprises the brace, wherein the brace is pivotingly connected to the second link attachment extension. This saves the installer on site additional manipulations that can be performed more efficiently by mass-production at the factory. The brace here can be pivotingly connected directly or through a brace-side link partner to the second link attachment extension. A hinge pin can be especially suitable for this connection.

In a further embodiment, the brace is retracted toward the inclined beam. This allows the packaging size of the assembly group to be kept small. Preferably, the brace is locked here to prevent unintentional unfolding, in particular, for shipment.

In another preferred embodiment, the assembly group according to the invention comprises multiple retaining elements for support profiles to be disposed perpendicular to the inclined beam, wherein the retaining elements are disposed at standard positions or in the proximity of these on the inclined beam. These retaining elements can preferably be shaped such that the support profiles are first of all attachable without tools, in particular, by simple insertion or hooking-in on the inclined beam, at least provisionally. This aspect advantageously allows additional time-consuming assembly steps on site to be eliminated that are implementable more efficiently in the factory and even by automated means.

The problem to be solved as described in the background is furthermore solved by the method for assembling an erection system wherein the assembly group comprises multiple retaining elements to be disposed perpendicular to the inclined beam. Thus, based on the components described herein for the erection system, the method is accordingly defined by the fact that an assembly group comprising the inclined beam and the two link attachment extensions is pre-assembled, wherein the first and the second link attachment extension on the inclined beam are permanently attached in a nonrotatable and longitudinally-guided fashion at their standard positions.

The assembling of the erection system is advantageously effected at the factory. It is possible there to industrially prefabricate the assembly group in mass production and have it undergo appropriate quality assurance. The erection system can then be delivered prefabricated to the site of the open-space installation and erected there.

In an especially advantageous further embodiment, the brace is simultaneously pre-assembled along with the assembly group, wherein the brace is pivotingly connected to the second link attachment extension and is retracted toward the inclined beam. To this end, the brace can be pivotingly connected to the second link attachment extension either directly or also through a brace-side link partner—in both cases preferably by means of a hinge pin. In addition, it is advantageous in particular for shipment that finally the brace be secured to prevent its unfolding from the inclined beam.

BRIEF DESCRIPTION OF THE DRAWINGS

An embodiment of the erection system according to the invention is described below based on the drawings. In the drawings.

DETAILED DESCRIPTION OF THE INVENTION

Figure 1:
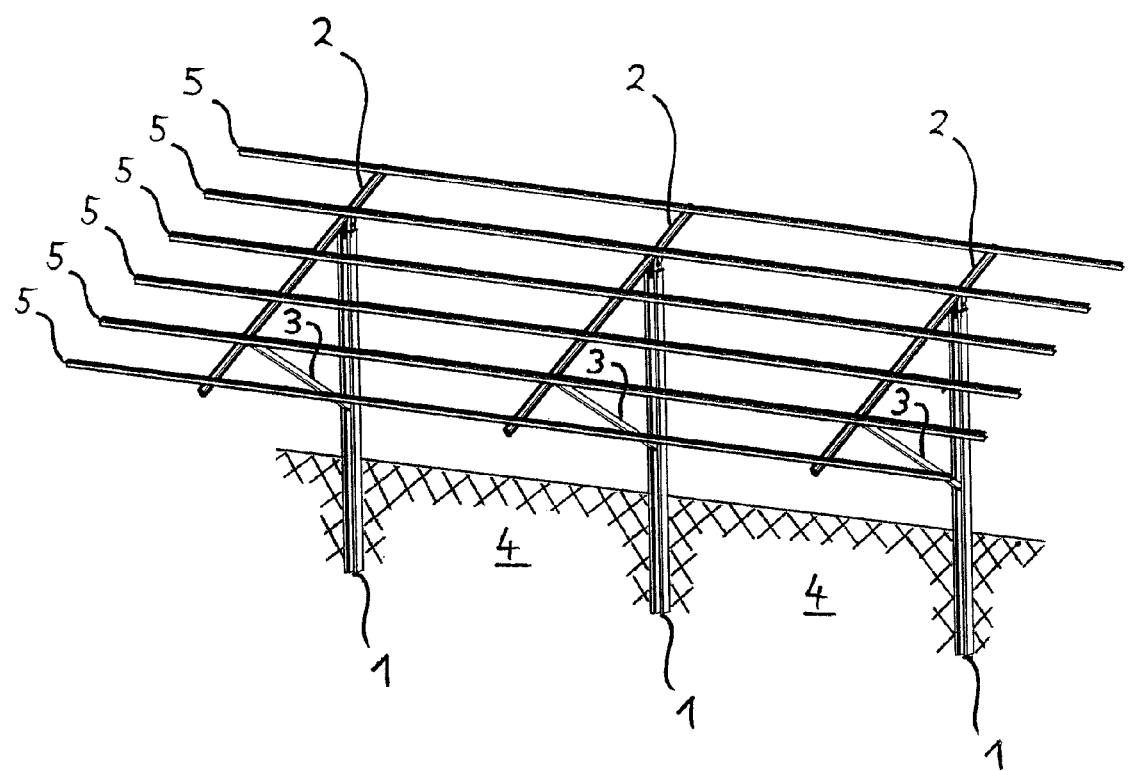
FIG. 1 shows the substructure of an open-space installation with three support stands.

To provide an overview, FIG. 1 shows the substructure of a photovoltaic open-space installation comprising three support stands erected from the erection system according to the invention. Each support stand comprises a column 1, an inclined beam 2, as well as a brace 3, these being combined through three link joints to form a triangular truss. The three link joints are explained in detail further below.

From FIG. 1 it is furthermore evident that the columns 1 stand vertically and are pile-driven by their bottom sections in the ground 4, being simultaneously spaced at uniform intervals to form a straight array of columns. The inclined beams 2 are attached to columns 1 perpendicular to the array of columns at an inclination of approximately 30°. To effect bracing of inclined beams 2 against columns 1, braces 3 are furthermore pivotingly connected at their bottom ends to inclined beams 1 and at their top ends to inclined beams 2. In addition, six module support profiles 5 are installed in uniformly spaced fashion on inclined beams 2 parallel to the column array. And finally, photovoltaic modules, not shown in detail here, can be installed on module support profiles 5.

Figure 2:
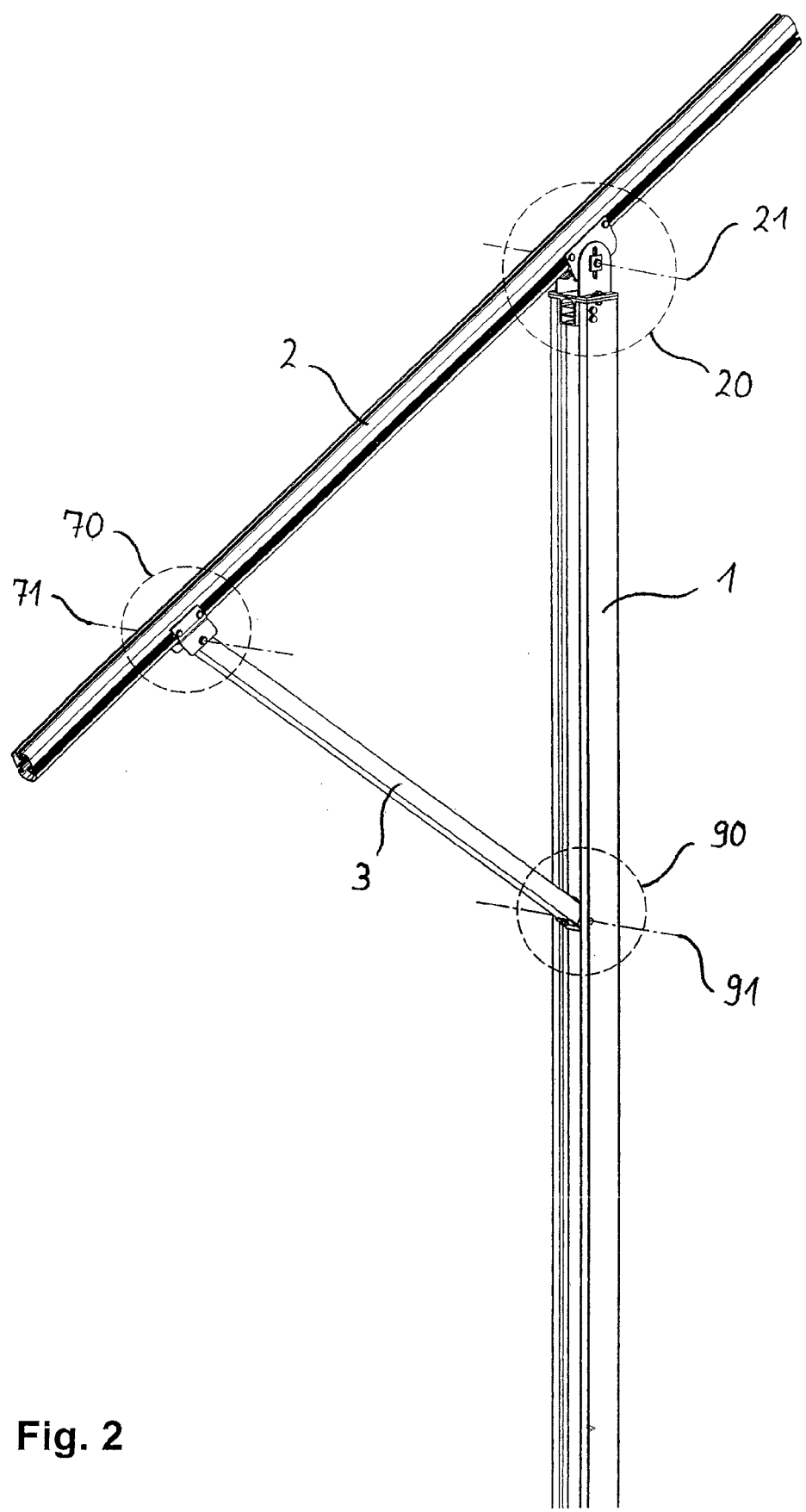
FIG. 2 shows the support stand of FIG. 1.

FIG. 2 shows one of the support stands of FIG. 1 with its three link joints 20, 70, and 90 in more detail, where first link joint 20 exists between inclined beam 2 and column 1, second link joint 70 exists between inclined beam 2 and brace 3, and third link joint 90 exists between brace 3 and column 1. The three link joints 20, 70, and 90 each have an intended tilt axis 21, 71, or 91 that runs approximately horizontally and ideally parallel to the column array.

Since the three distances between link joints 20, 70, and 90, or between their tilt axes 21, 71, and 91, are permanently set, the triangle enclosed by column 1, inclined beam 2, and brace 3 is geometrically defined in terms of its interior angles. It is therefore not necessary for torques to be accommodated at tilt axes 21, 71, or 91.

The main geometry of the support stand is based on the result of a structural analysis that preferably can be performed by the structural engineer, and that in particular takes into account the desired inclination, length, and mechanical load of inclined beam 2. The positions of first and second link joints 20 and 70 along inclined beam 2, and the position of third link joint 90 along column 1, are accordingly determined by this structural analysis, as are thus the standard positions. For an installer, these standard positions can also advantageously gleaned on site from a construction drawing based on the structural analysis.

Figure 3:
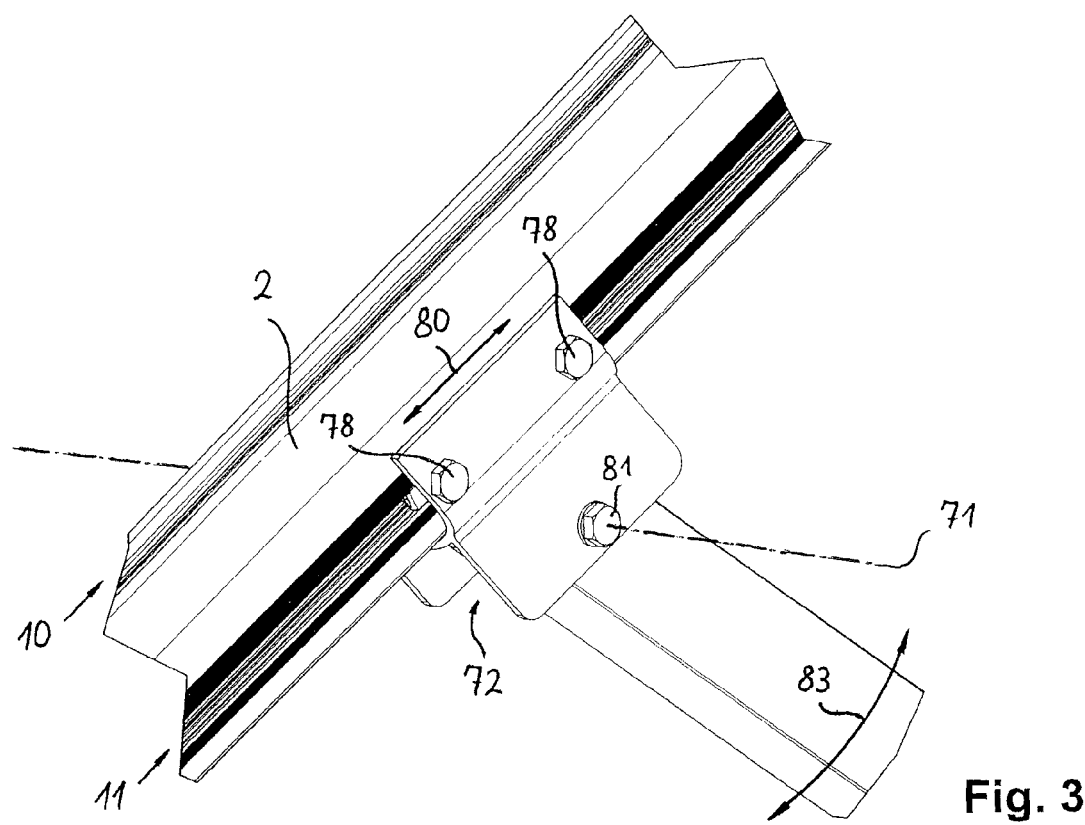
FIG. 3 and FIG. 4 show the second link joint of the support stand of FIG. 2 in detail.
Figure 4:
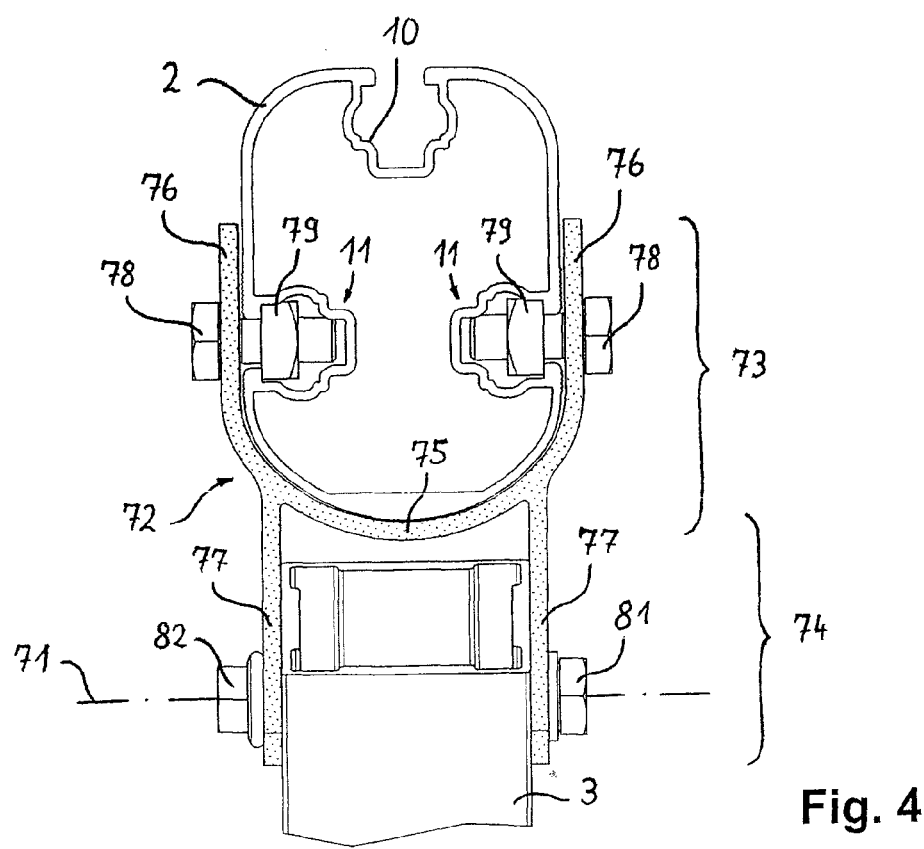

FIG. 3 and FIG. 4 first illustrate the simpler second link joint 70 of the support stand of FIG. 2 in detail. The main element of second link joint 70 is link attachment extension 72, the face of which is highlighted by dot-hatching. Link attachment extension 72 is essentially a symmetrical extruded part, the upper portion of which consists of an attachment section 73 and the lower portion of which consists of a link section 74. Both attachment section 73 and link section 74 are designed in an approximate U-profile shape, wherein attachment section 73 opens upward while link section 74 opens downward, and attachment section 73 has two spaced flanges 76 while link section 74 has two spaced flanges 77, and the two section 73 and 74 are divided by a shared center bridge 75, thereby producing for link attachment extension 72 a profile having an approximately double-U-shaped or H-shaped cross-section.

In addition, FIG. 4 reveals the special cross-section of inclined beam 2. Inclined beam 2 is a hollow extruded profile having a rectangular basic shape, the corner regions and bottom side of which are highly rounded. In the top side of inclined beam 2, an undercut longitudinal groove 10 is integrated that is provided to attach module support profiles 5 shown in FIG. 1. In addition, another undercut longitudinal groove 11 each is integrated in the left and right outer faces of inclined beam 2, both grooves being used to attach link attachment extension 72. One last aspect to mention is that the corrugations visible on both sides on the opening slots of longitudinal grooves 11 and illustrated due to the scale as black strips in the illustrations are only of secondary importance here.

FIG. 3 and FIG. 4 furthermore show that link attachment extension 72 is attached to inclined beam 2 according to the invention in a nonrotatably longitudinally guided manner. To this end, link attachment extension 72 is slidably clamped in place bilaterally by two bolt connections each at undercut longitudinal grooves 11 of inclined beam 2. The four bolt connections each comprise one screw bolt 78 as well as a square nut 79 that functions as a slot element. Screw bolts 78 here pass through four corresponding holes in the two flanges 76 of extension section 73 into undercut longitudinal grooves 11 where they are tensioned by square nuts 97 axially against the undercuts of longitudinal grooves 11. Since there are two screw connections each for the left and right outer faces of inclined beam 2, and these connections are spaced along longitudinal grooves 11, link attachment extension 72 cannot be rotated on inclined beam 2. In complementary fashion, the inner contour of attachment section 72 corresponds over a large area to the outer contour of inclined beam 2, with the result that link attachment extension 72 is guided slidably along inclined beam 2 analogously to a shoe. Once the four screw connections are loosened, link attachment extension 72 can be slid along inclined beam 2, or in one of the directions of the double arrow 80, out of its standard position and permanently reattached on inclined beam 2 at another position or at a corrected position.

In addition, FIG. 3 and FIG. 4 reveal how brace 3 is swivelably supported by a screw bolt 81 on link attachment extension 74 in the directions of double arrow 83. Flanges 77 of link attachment extension 74 thus encompass the top end of brace 3 analogously to a joint fork, where hinge pin 81 passes through two axial holes in flanges 77, and through two axial holes in the upper end region of brace 3, and is axially secured by a nut 82. Hinge pin 81 runs in tilt axis 71 correspondingly below inclined beam 2. In addition, the connection between brace 3, which has a hollow profile, and link attachment extension 72 is designed such that brace 3 is retractable towards inclined beam 2. To this end, sufficient freedom of movement is provided between the top end of brace 3 and center bridge 75 of link attachment extension 72.

Figure 5:
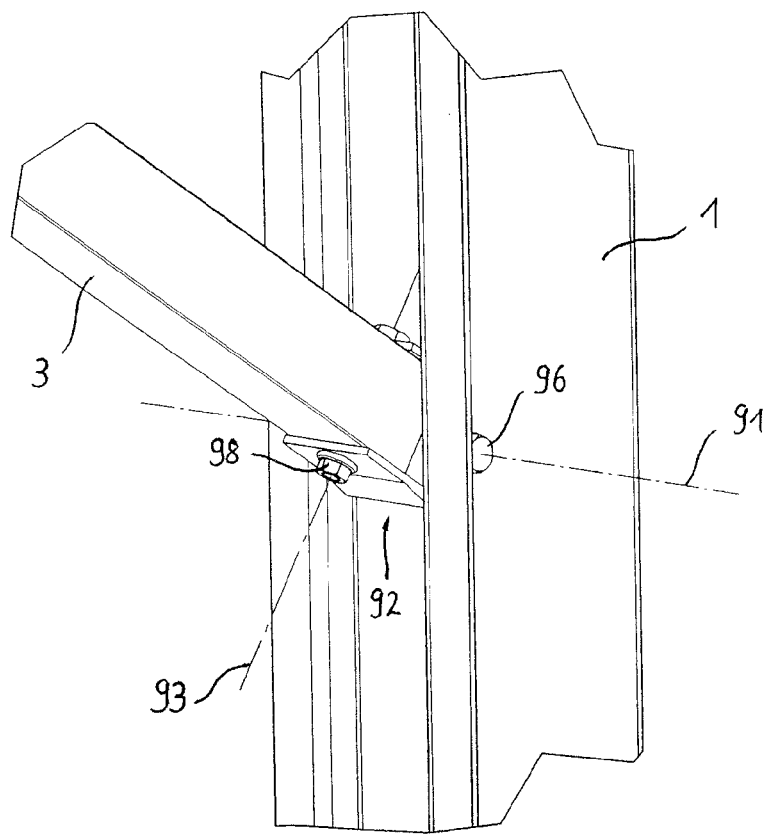
FIG. 5 and FIG. 6 show the third link joint of the support stand of FIG. 2 in detail.
Figure 6:
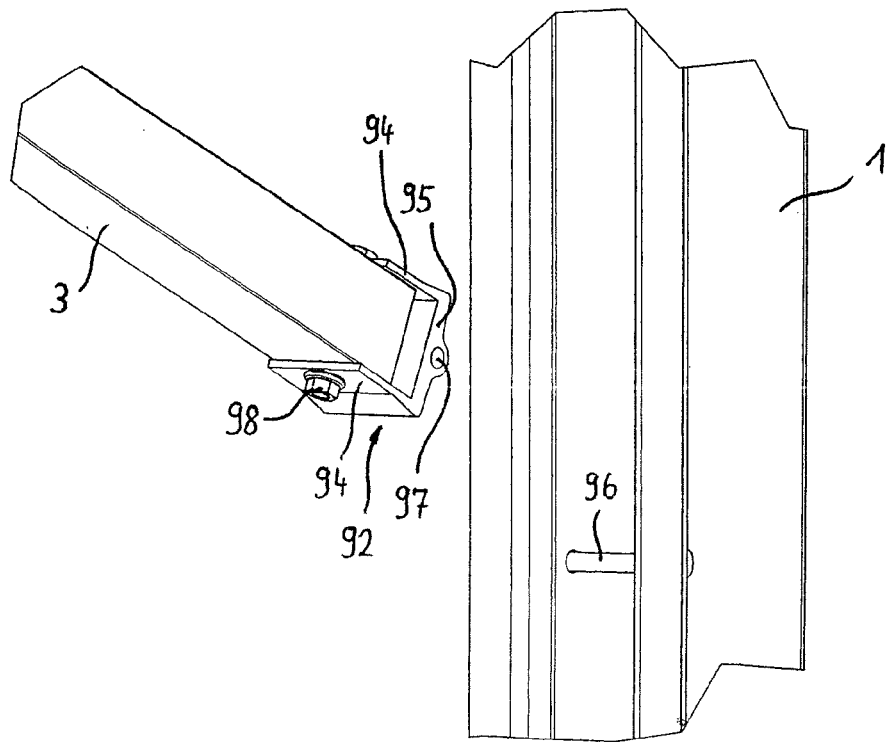

FIG. 5 and FIG. 6 show first link joint 90 of the support stand in FIG. 2 in detail. The main element of third link joint 90 is a joint body 92 that pivotingly connects brace 3 to column 1 at tilt axis 91, as well as at a rotational axis 93 perpendicular thereto in two rotatory degrees of freedom, and functions like a universal joint, the axes of which do not, however, intersect a one point.

What is revealed in particular in the exploded view of FIG. 6 is that joint body 92 is designed as a U-profile-shaped extruded part having two opposing flanges 94 and a center bridge 95, and is pivotingly attached about tilt axis 91 by a first hinge pin 96 between two side walls of column 1. To this end, a cylindrical bolt receptacle 97 is integrated in the middle of center bridge 95, the bolt receptacle running parallel to tilt axis 91. First hinge pin 96 passes through this bolt receptacle 97, as well as on the left and right through two axial holes, not shown in detail here, in the side walls of column 1 that is designed as a U-profile-shaped or slightly trapezoidal rolled section, with the result that column 1 receives joint body 92 tiltably in the manner of a joint fork and brace 3 is thus movable in its inclination. The axial holes in the side walls along column 1 have preferably already been provided in the factory. And their position is advantageously based on the structural analysis referenced in the introduction.

In addition, brace 3 is swivelably connected about rotational axis 93 by a second hinge pin 98. To this end, the two flanges 94 encompass the bottom end of brace 3 at its top and bottom side, two axial holes each are cut out in the two flanges 94 as well as in the top and bottom side of the end of brace 3, through which holes second hinge pin 98 passes. This allows joint body 92 to swivelably accommodate brace 3 between flanges 94 also in the manner of a fork, with the result that brace 3 is correctly alignable in the event of any twisting of column 1 from the column array.

Figure 7:
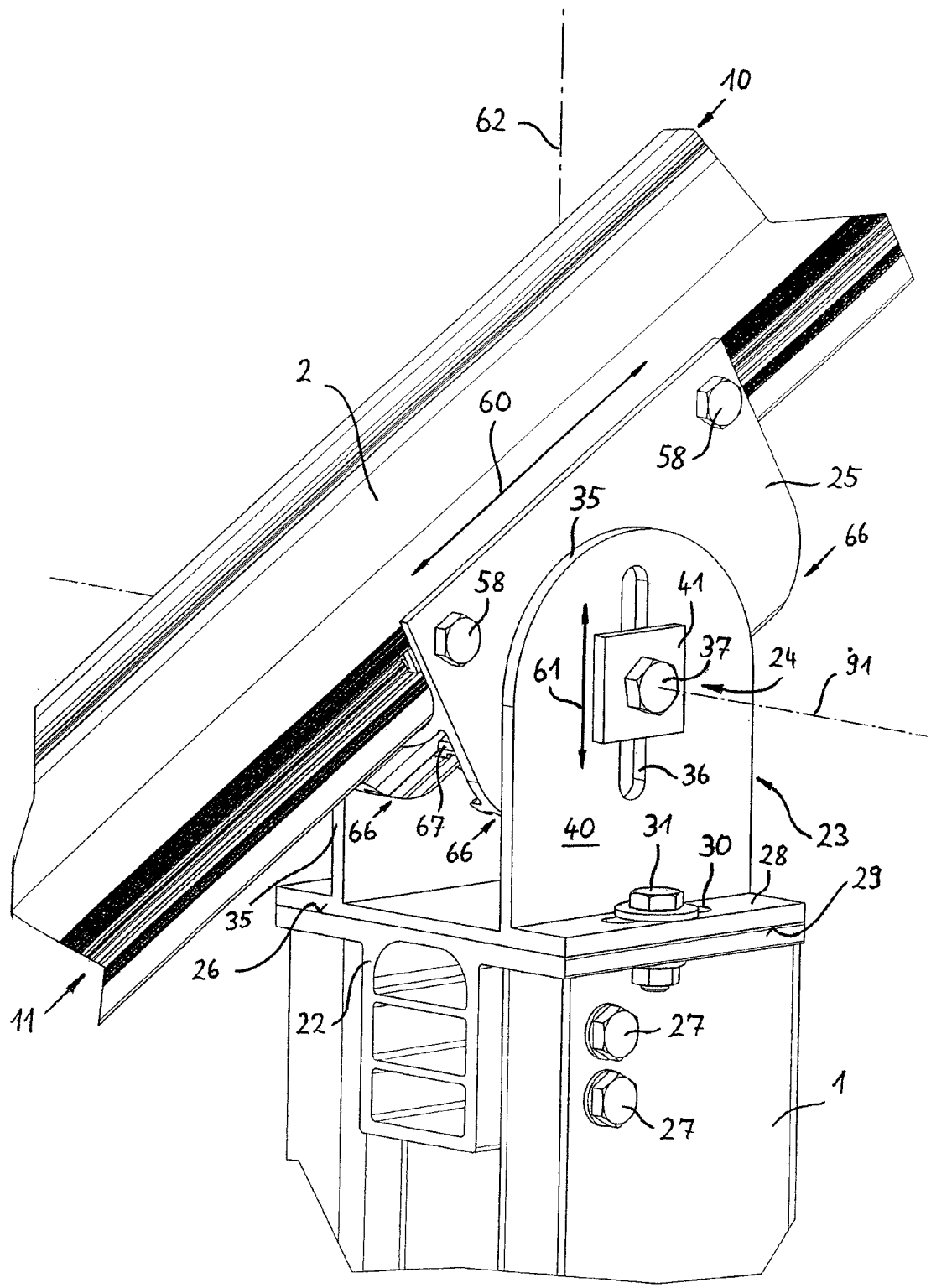
FIG. 7 shows the first link joint of the support stand of FIG. 2 in detail.
Figure 8:
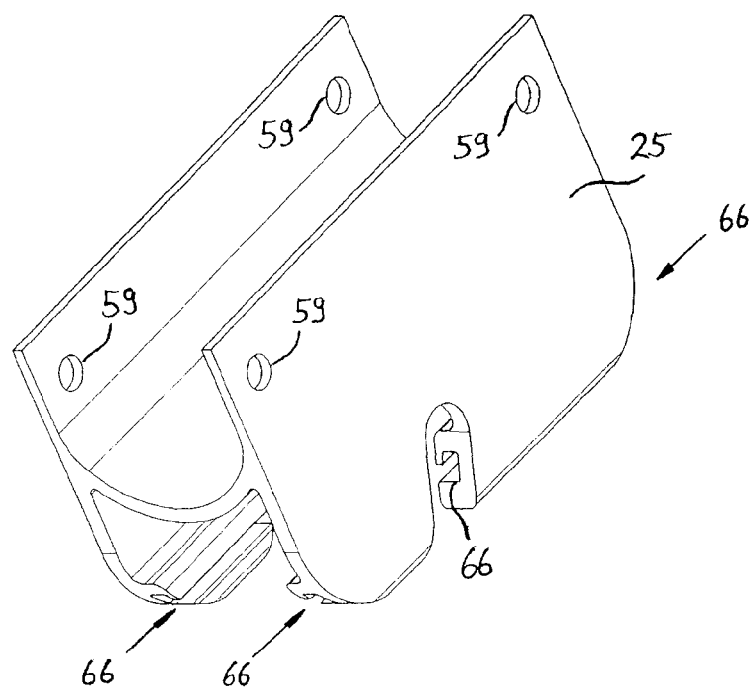
FIG. 8 through FIG. 10 show components of the first link joint of FIG. 7.

FIG. 7 shows first link joint 20 of the support stand of FIG. 2 in detail. First link joint 20 essentially comprises a platform 22 attached to column 1, a fork head 23 slidably disposed on platform 22 with a joint axis 24, as well as a link attachment extension 25 tiltably supported by joint axis 24, which link attachment extension in turn is slidably attached to inclined beam 2. To provide further clarification, FIG. 8 through FIG. 10 separately illustrate the most important elements of first link joint 20.

Platform 22 is an extruded part with a T-shaped cross-section that has a wide center bridge with cavities. In addition, platform 22 has a flat top side 26 that provides a horizontal bearing surface for fork head 23 on the head of column 1. Attachment of platform 22 to column 1 is effected by two screw connections 27 that pass through corresponding holes in the side walls of column 1 and in the center bridge of platform 22.

Fork head 23 is also fabricated from an extruded part. It has a base 28 with a flat bottom side 29 that acts as a slide partner to top side 26 of platform 22. Fork head 23 can thus be slid and rotated on platform 22, where for purposes of attachment and guiding in platform 22 two slot holes, not shown in detail and oriented perpendicular to inclined beam 2, are cut out, and two more slot holes 30 are cut out in the left and right side of base 28 that run parallel to inclined beam 2. Slot holes 30 in base 28, as well as the slot holes in platform 22, are thus disposed such that these each form an intersecting hole pair, where one screw connection exists for each hole pair. This enables fork head 23 to be slid a small distance on platform 22 relative to column 1 transversely and also longitudinally relative to the column array, and then fixed in place. Since there is freedom of movement between the hole walls of the two hole pairs, on the one hand, and the shafts of screw connections 31, on the other hand, fork head 23 can also be rotated slightly about a vertical rotational axis 62 relative to platform 22 in order to correctly align inclined beam 2 in azimuth in the event of any twisting of column 1 away from the column array. This correction can be effected together with brace 3 since the brace, as indicated in FIG. 5 and FIG. 6, is also pivotingly connected in two rotatory degrees of freedom to column 1. The fact that rotational axis 93 of joint body 92 of FIG. 5 here does not align with rotational axis 62 can be tolerated given the generally small correction angles.

Also evident is the fact that two parallel spaced fork flanges 35 are disposed vertically on base 28 of fork head 23, in which flanges one vertical axial slot 36 each is cut out for joint axis 24 to enable height-adjustable mounting. As is evident in particular in FIG. 9, joint axis 24 comprises a screw bolt 37 passing through both axial slots 36, a nut 38, and a cylindrical spacer sleeve 39 that is disposed between the two fork flanges 35 and coaxially on screw bolt 37. In addition, one square washer 41 each is coaxially interposed between the outer faces 40 of fork flanges 35 and the head of screw bolt 37 or of nut 38. The essential aspect here is that joint axis 24 be height-adjustable in axial slots 36 or in one of the directions of arrow 61. To this end, screw bolt 37 can be loosened, slid down or up, and retightened at another level, where spacer sleeve 39 prevents fork flanges 35 from being subject to bending stress. To prevent joint axis 24 from unintentionally slipping down or up, horizontal serrations, not shown in the drawing, are incorporated both in the outer faces 40 of fork flanges 35 and on the inner faces of square washers 41, these serrations engaging when joint axis 24 is tensioned. This enables joint axis 24 to be height-adjustable virtually continuously on fork flanges 35 along axial slots 36, and also be secured against slippage. Thee serrations can preferably be produced as part of the extrusion process.

FIG. 7 through FIG. 10 furthermore reveal that link attachment extension 25 is designed in a very similar manner to link attachment extension 72 of the second link joint of FIG. 3 and FIG. 4. Link attachment extension 25 is thus also essentially a symmetrical extruded part, the top of which consists of an attachment section 53 and the bottom of which consists of a link section 54. Similarly, attachment section 53 and link section 54 are of approximately U-profile-shaped design, wherein attachment section 53 opens upward and link section 54 opens downward, and attachment section 53 has two spaced flanges 56 while link section 54 has two spaced flanges 57, and the two sections 53 and 54 are separated by a shared center bridge 55, thereby creating a profile with an approximately double-U-shaped or approximately H-shaped cross-section.

Link attachment extension 25 is also mounted in a nonrotatably longitudinally guided manner on inclined beam 2. To this end, link attachment extension 25 is again clamped in place bilaterally by two screw connections each at undercut longitudinal grooves 11 of inclined beam 2. The four screw connections comprise one screw bolt each 58 as well as a square nut that is used as a slot element. Screw bolts 58 here pass through corresponding holes 59 in the two flanges 56 of attachment section 53 into undercut longitudinal grooves 11 where they are axially tightened against the undercuts of longitudinal grooves 11 by the square nuts. Since, as with link attachment extension 72 of FIG. 3 and FIG. 4, there are two screw connections each for the left and right outer face of inclined beam 2, and these are spaced along longitudinal grooves 11, link attachment extension 25 also cannot be rotated on inclined beam 2. Similarly, the inner contour of attachment section 53 corresponds over an extended area with the outer contour of inclined beam 2, with the result that link attachment extension 25 is slidably guided along inclined beam 2 analogously to a shoe. If the tour screw connections are loosened, inclined beam 2 can be slid relative to link attachment extension 25 in one of the directions of double arrow 60, then permanently reattached.

In addition, FIG. 7 through FIG. 10 disclose how inclined beam 2 is pivotingly supported on link attachment extension 25 through joint axis 24 on fork head 23. Fork flanges 35 thus encompass flanges 57 of link section 54, where joint axis 24 runs in the intended tilt axis 21 below inclined beam 2.

An essential difference from link attachment extension 72 of the second link joint of FIG. 3 and FIG. 4, however, consists in the fact that for purposes of a pivot bearing in flanges 57 it is not two axial holes but two downwardly-open axial slots 65 that are provided. This approach enables inclined beam 2 to be tiltably attached to fork head 23 by simple mounting on joint axis 24. Joint axis 24 can thus already be preinstalled on fork head 23 at the factory.

In addition, two guide grooves 66 are incorporated in the two inner faces of the two flanges 57, which grooves run parallel to inclined beam 2 and are interrupted by axial slots 65. A locking plate 67 is inserted into guide grooves 66, the plate being used to radially secure joint axis 24 in link attachment extension 72. To this end, guide grooves 66 are provided directly below spacer sleeve 39, with the result that link attachment extension 72 is no longer detachable from fork head 23 once locking plate 67 is inserted, as is evident in particular in FIG. 10 and subsequently in FIG. 13. Guide grooves 66 and the corresponding edges of locking plate 67 are preferably designed such that locking plate 67 is insertable by being driven in and is then retained by self-locking.

Figure 11:
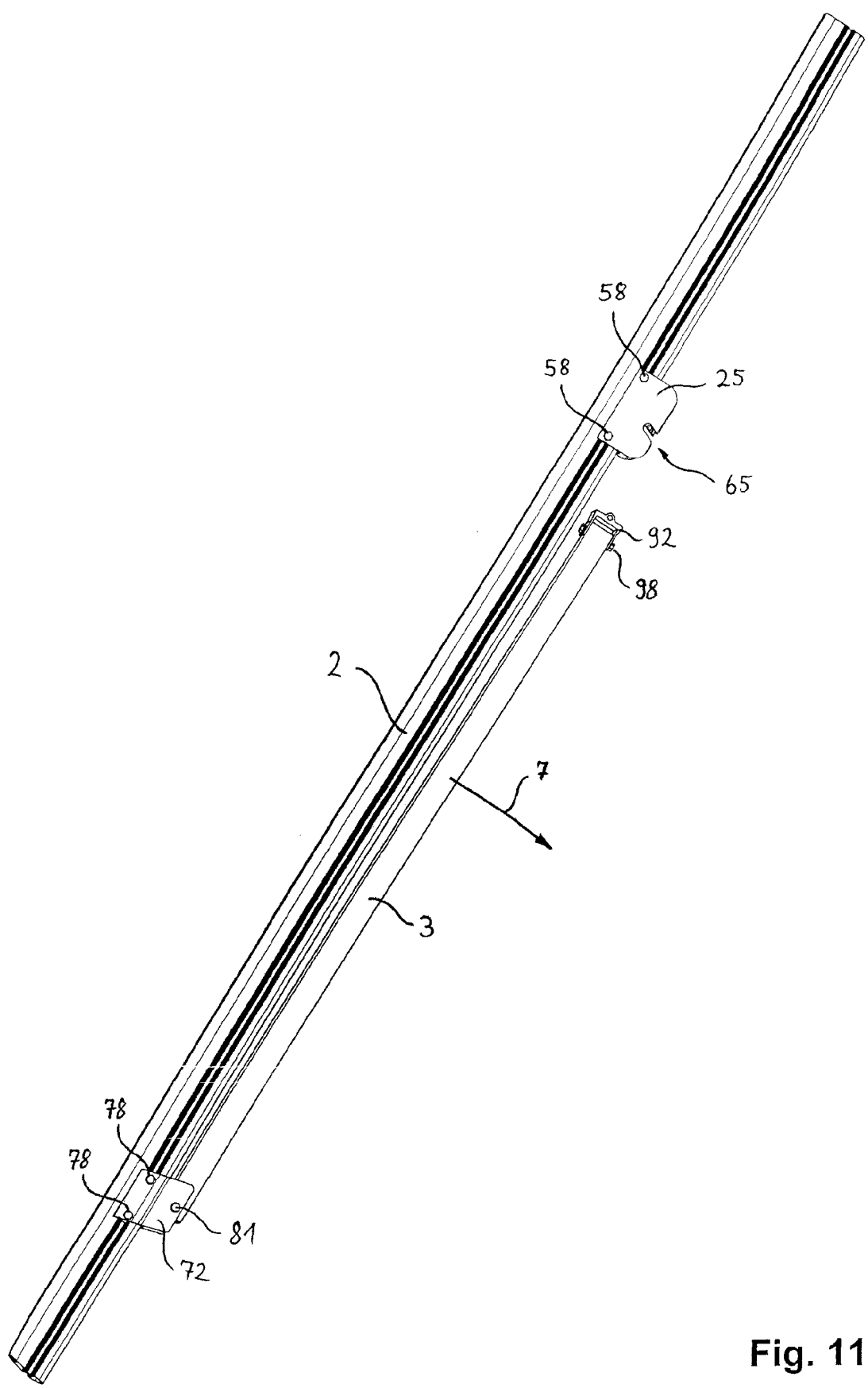
FIG. 11 shows a prefabricated assembly group of the support stand of FIG. 2.

FIG. 11 shows a prefabricated assembly group according to the invention as installed in the support stand of FIG. 2. The assembly group comprises in particular inclined beam 2, link attachment extension 25 of first link joint 20, link attachment extension 72 of second link joint 70, as well as brace 3 and link body 92.

Figure 10:
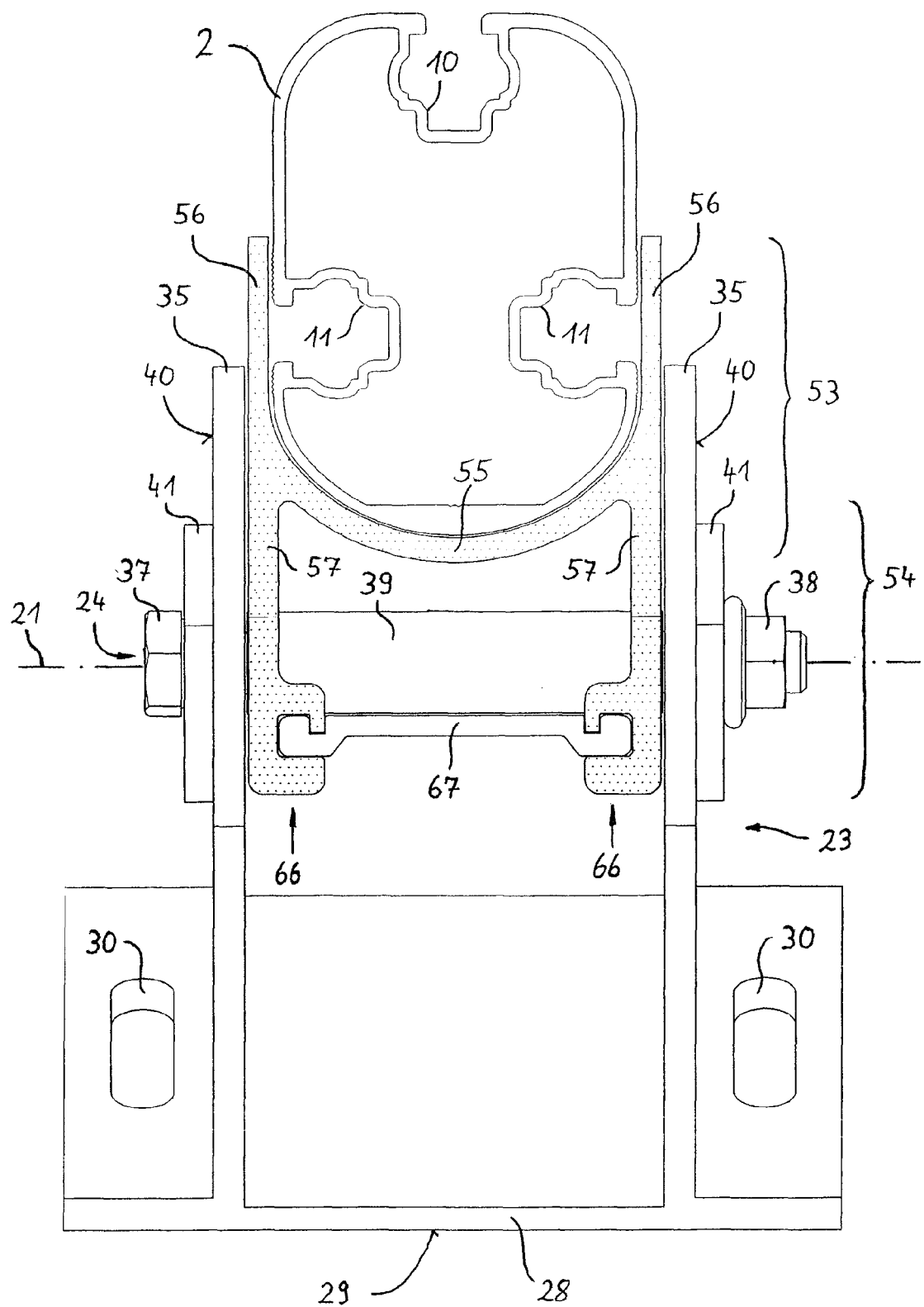

As described above in regard to FIG. 3 and FIG. 4, or FIG. 7 through and FIG. 10, the two link attachment extensions 72 and 25 are permanently attached in a nonrotatably longitudinally guided manner to inclined beam 2 by screw bolts 78 or 58. What is important here is that link attachment extensions 72 and 25 are already attached in the standard positions seen in FIG. 1 and FIG. 2, so that given that column 1 has been erected exactly according to the plan, or with a deviation tolerable by the plan, link attachment extensions 72 and 25 no longer have to be readjusted by the installer at the construction site. Otherwise, it is nevertheless still possible arrange link attachment extensions 72 and 25 in corrected positions deviating from the standard positions by loosening, sliding and reattachment.

In addition, it is evident, as described for FIG. 3 and FIG. 4, that second link joint 70 between inclined beam 2 and brace 3 is already created by hinge pin 81, and joint body 97 is also already disposed a the lower or other end of brace 3 by hinge pin 97.

As described, the prefabricated assembly group can be prefabricated in large production runs at the factory or by the supplier, then delivered to the erection site of the open-space installation. As described, brace 3 is folded against or close to inclined beam 2 for transport purposes. An especially characterizing aspect of the prefabricated assembly group is thus that brace 3 must first be unfolded in a swivel motion indicated by arrow 7 in order to create third link joint 90 in FIG. 5 and FIG. 6.

Figure 12:
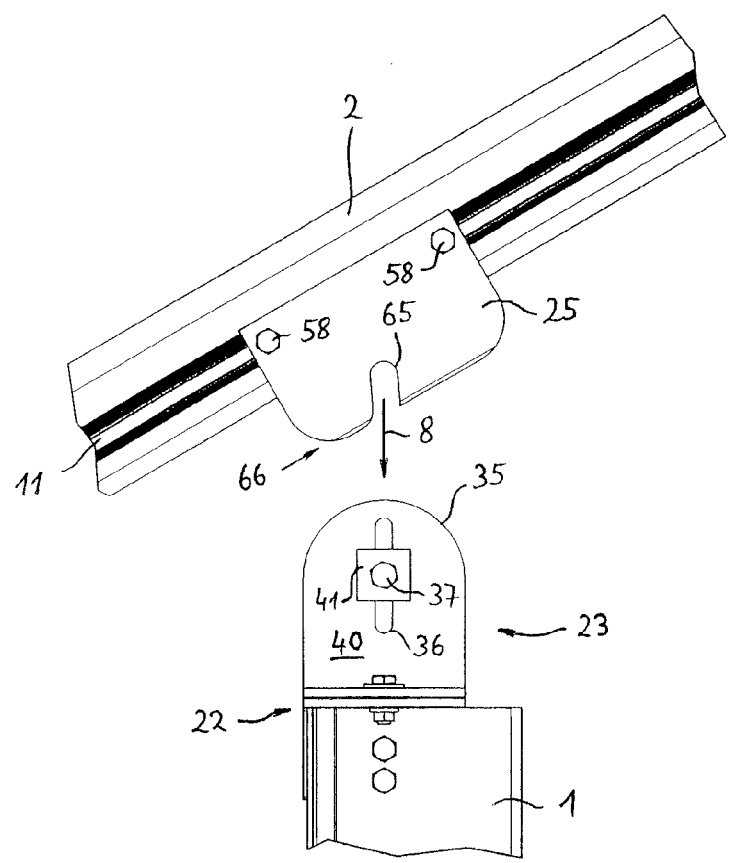
FIG. 12 and FIG. 13 show the first link joint of FIG. 7 along with installation procedures.
Figure 13:
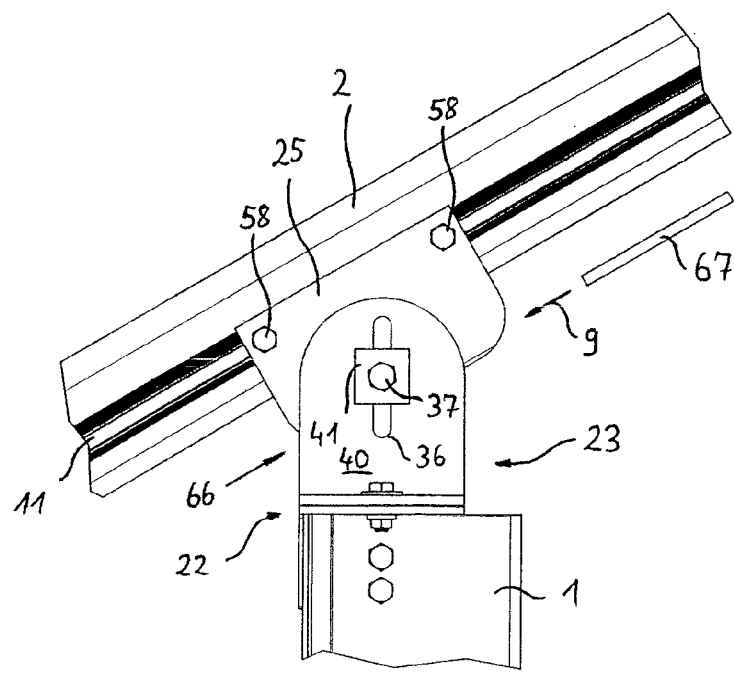

FIG. 12 and FIG. 13 illustrate how the prefabricated assembly group of FIG. 11 is disposed on column 1 by producing first link joint 20. In preparation, column 1 has first been driven into ground 4 as in FIG. 1, and platform 22, fork head 23, and link axis 24 are then installed as indicated in FIG. 9.

Figure 9:
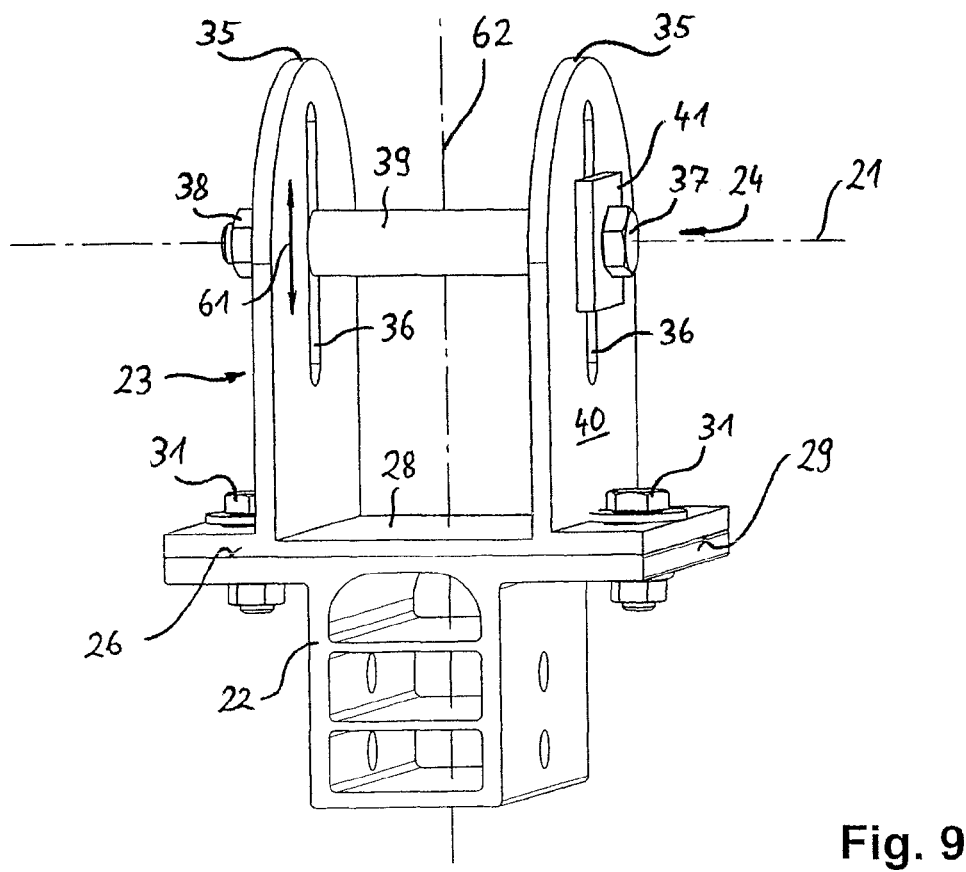

It must be pointed out in this regard that the assembly shown in FIG. 9 can also already have been preassembled at the factory.

Also evident in FIG. 12 is how before attachment the prefabricated assembly group is raised above column 1 such that axial slots 65 of link attachment extension 25 are located over joint axis 24 of fork head 23. The prefabricated assembly group is then passed downward in the direction of arrow 8 between fork flanges 35 of fork head 23 such that the two axial slots 65 are seated on spacer sleeve 39 of joint axis 24 up to the stop.

In order to subsequently effect radial locking, as shown in FIG. 13, locking plate 67 is moved in the direction of arrow 9 into guide grooves 66, and thus below spacer sleeve 39, with the result that the prefabricated assembly group can no longer be unintentionally detached from fork head 23 or from column 1.

In a subsequent installation step, brace 3, not shown here, of the prefabricated assembly group can be unfolded from inclined beam 2, the entire assembly group swiveled somewhat when necessary about tilt axis 21, and the third link joint then also created.

Figure 14:
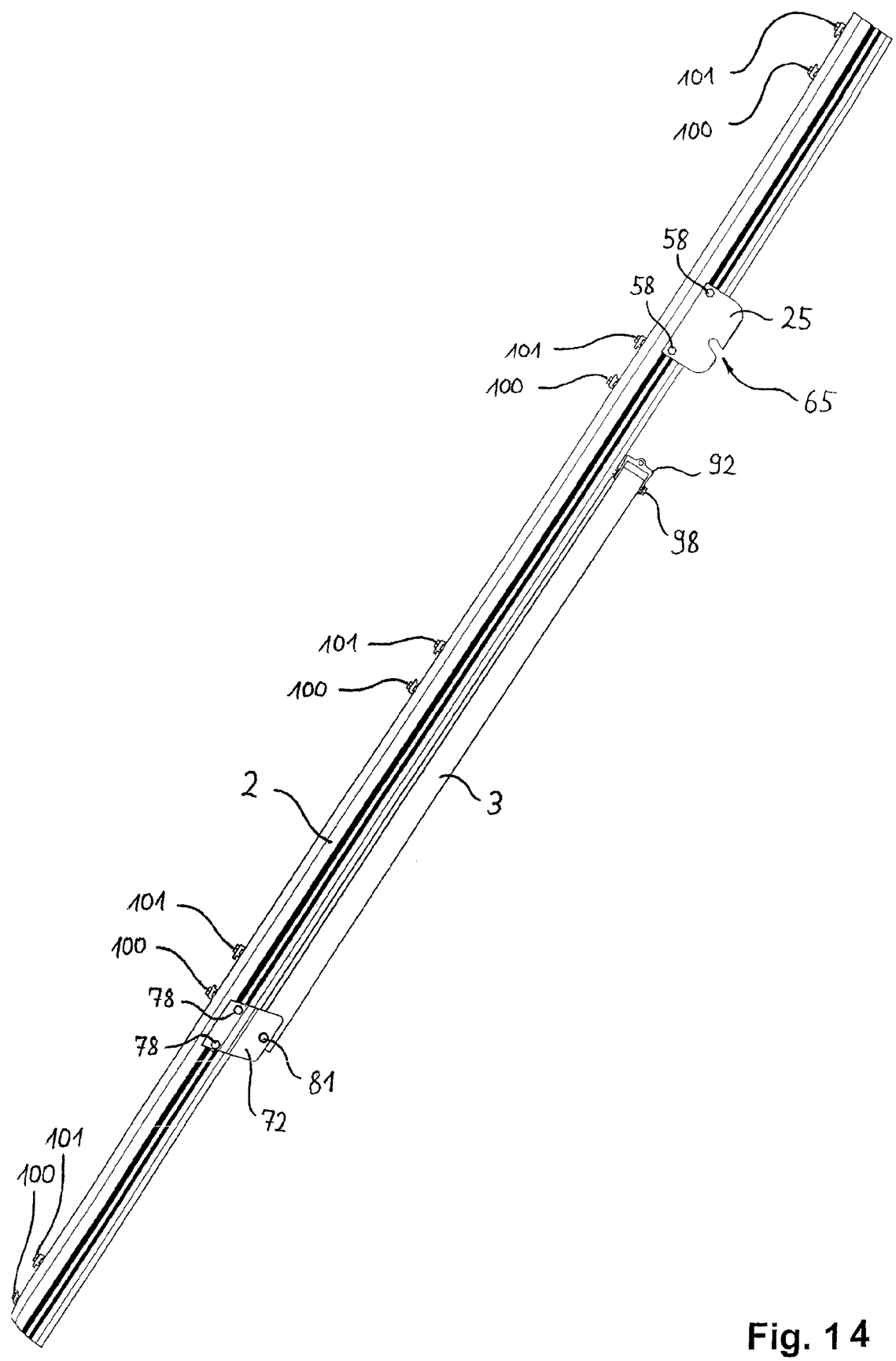
FIG. 14 shows an assembly group of FIG. 11 augmented with fasteners.

Finally, FIG. 14 shows the assembly group of FIG. 11, to which five clamps 100 and 101 have been added that are provided to attach module support profile 5 disposed on inclined beam 2. Here each of clamps 100 and 101 form one of five clamp pairs. Not shown is the fact that the bottom clamps 100 and the top clamps 101 of each clamp pair can encompass a retaining segment provided bilaterally on module support profile 5.

Clamps 100 and 101 are slidably attached in undercut longitudinal groove 10 of FIG. 4 and FIG. 10 by slot elements. What is essential is that bottom clamps 100 are already disposed at their standard positions and are designed such that module support profile 5 is attachable by an installer without tools, if possible by insertion and hooking in the bottom part of the retaining element as initially held provisionally on the inclined beam, and then by clamping permanently using clamps 100. Top clamps 101 are disposed somewhat above their standard positions so that they do not impede mounting of module support profiles 5. After mounting, clamps 101 can be loosened as necessary, placed at the top side of the retaining element of module support profile 5, and similarly tightened down.

What is claimed is:

1. An erection system for a photovoltaic open-space installation support stand, each support stand comprising a column (1) to be driven into the ground and an inclined beam (2), and a brace (3) to brace the inclined beam (2) obliquely downward against the column (1), wherein the column (1), the inclined beam (2), and the brace (3) can be combined into a firmly adjustable support stand in the form of a triangular truss, and to this end a first link joint (20) is disposed between inclined beam (2) and column (1), a second link joint (70) is disposed between inclined beam (2) and brace (3), and a third link joint (90) is disposed between brace (3) and column (1), and the first link joint (20) comprises a first link attachment extension (25), and the second link joint (70) comprises a second link attachment extension (72), and the two link attachment extensions (25, 72) are able to be disposed on and be longitudinally guided by the inclined beam (2), characterized in that an assembly group comprising the inclined beam (2) and the two link attachment extensions (25, 72) is assembled, wherein the two link attachment extensions (25, 72) are nonrotatably longitudinally guided on the inclined beam (2) and permanently attached there at standard positions, and that the column (1) is pivotably connectable to the first link attachment extension

(25) and the brace (3) is pivotably connectable to the second link attachment extension (72), wherein at least one of the two link attachment extensions (25, 72) has a link section (54, 74) to support a hinge pin (24, 81), wherein the link section (54, 74) is disposed such that the rotational axis (21, 71) of a hinge pin (24, 81) supported there crosses the inclined beam (2) externally, wherein the link section (54, 74) of at least one link attachment extension (25, 72) is designed in a U-profile shape, and wherein at least one of the two link attachment extensions (25, 72) is designed in an H-profile shape, wherein the shape of the link attachment extension (25, 72) results from the U-profile-shaped link section (54, 72) and an U-profile-shaped attachment section (53, 73).

2. The erection system according to claim 1, wherein the link section (54) of at least one link attachment extension (25) has open axial slots (65) to support a hinge pin (24).

3. The erection system according to claim 2, wherein the open axial slots (65) of the link section (54) of the first link attachment extension (25) are designed such that these slots open downward when the support stand is erected.

4. The erection system according to claim 2, wherein the link section (54) of at least one link attachment extension (25) comprises a locking means to prevent radial loosening of a hinge pin (24) from the open axial slots (65).

5. The erection system according to claim 4, further comprising a locking plate (67) provided to secure against radial loosening, the locking plate being insertable into the link section (54) tangentially to a hinge pin (24).

6. The erection system according to claim 1, wherein the inclined beam (2) has at least one longitudinal groove (11) to longitudinally guide the two link attachment extensions (25, 72).

7. The erection system according to claim 1, wherein at least one of the two link attachment extensions (25, 72) has a U-profile-shaped attachment section (53, 73) to which the link attachment extension (25, 72) is attached to the inclined beam (2) in a nonrotatably longitudinally guided manner.

8. The erection system according to claim 1, wherein the first link joint (20) comprises a fork head that is mounted on the top end of the column (1), and can be pivotingly connected through a hinge pin (24) to the first link attachment extension (25).

9. The erection system according to claim 8, wherein the separate fork head can be slidably mounted perpendicular to column (1) and/or parallel to column (1).

10. The erection system according to claim 8, wherein the separate fork head can receive a hinge pin (24) in height-adjustable fashion.

11. The erection system according to claim 1, wherein at least one additional rotatory degree of freedom is provided in the first and third link joint (20, 90) to compensate for twisting of an erected column (1) away from a column array.

12. The erection system according to claim 11, wherein the separate fork head can be mounted around the column (1) and/or vertically rotatably on the top end of the column (1).

13. The erection system according to claim 11, wherein the third link joint (90) comprises a link part having two mutually perpendicular rotational axes (91, 93), wherein the link part can be disposed on the column (1) and at the bottom end of the brace (3).

14. The erection system according to claim 1, wherein multiple axial holes for the third link joint (90) along the column (1) are provided at various heights for a hinge pin (96).

15. The erection system according to claim 1, wherein the assembly group comprises the brace (3) and the brace (3) is pivotably connected to the second link attachment extension (72).

16. The erection system according to claim 15, wherein the brace (3) is folded towards the inclined beam (2).

17. The erection system according to claim 1, wherein the assembly group comprises multiple retaining elements (100, 101) for support profiles (5) to be disposed perpendicular to the inclined beam (2) and the retaining elements (100, 101) are disposed at standard positions or in proximity of the positions on the inclined beam (2).

18. A method of assembling an erection system according to claim 1 for a photovoltaic open-space installation support stand, the method comprising the step of assembling at least one support stand from the erection system having at least a column (1) to be driven into the ground and an inclined beam (2), and a brace (3) to brace the inclined beam (2) obliquely downward against the column (1), wherein the column (1), the inclined beam (2), and the brace (3) can be combined into a firmly adjustable support stand in the form of a triangular truss, and to this end a first link joint (20) is disposed between inclined beam (2) and column (1), a second link joint (70) is disposed between inclined beam (2) and brace (3), and a third link joint (90) is disposed between brace (3) and column (1), and the first link joint (20) comprises a first link attachment extension (25), and the second link joint comprises (70) a second link attachment extension (72), and the two link attachment extensions (25, 72) are able to be disposed on and be longitudinally guided by the inclined beam (2), characterized in that an assembly group comprising the inclined beam (2) and the two link attachment extensions (25, 72) is preassembled, wherein the first and the second link attachment extensions (25, 72) are permanently attached in a nonrotatably longitudinally-guided manner on the inclined beam (2) at standard positions, and that the column (1) is pivotably connectable to the first link attachment extension (25), and the brace (3) is pivotably connectable to the second link attachment extension (72).

19. The method according to claim 18, wherein the brace (3) is preinstalled together with the assembly group, the brace (3) being pivotably connected to the second link attachment extension (72), and retracted toward the inclined beam (2).

20. The method according to claim 18, further comprising arranging multiple retaining elements for support profiles (5) perpendicular to the inclined beam (2), and preinstalling retaining elements (10, 10) together with the assembly group, wherein the retaining elements (100, 101) are attached on the inclined beam (2) at standard positions or in the proximity of these positions.

21. The method of claim 20, further comprising installing photovoltaic modules on the support profiles (5).

22. The support stand of an erection system according to claim 1, wherein the column (1), the inclined beam (2), and the brace (3) are combined into the firmly adjustable support stand in the form of a triangular truss, including the first link joint (20), the second link joint (70), and the third link joint (90).

23. The support stand according to claim 22, wherein the column (1) is clamped in place in stationary fashion.

* * * * *